(12) United States Patent
Calkins et al.

(10) Patent No.: US 9,575,632 B2
(45) Date of Patent: Feb. 21, 2017

(54) CONTENT SCRUBBING

(71) Applicant: Cable Television Laboratories, Inc., Louisville, CO (US)

(72) Inventors: Mickie Calkins, Santa Cruz, CA (US); Hans Loedolff, Pine, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 278 days.

(21) Appl. No.: 14/164,171

(22) Filed: Jan. 25, 2014

(65) Prior Publication Data

US 2014/0215413 A1 Jul. 31, 2014

Related U.S. Application Data

(60) Provisional application No. 61/756,496, filed on Jan. 25, 2013.

(51) Int. Cl.
| | | |
|---|---|---|
| *G06F 3/0483* | (2013.01) |
| *G06F 3/0484* | (2013.01) |
| *G06F 3/0485* | (2013.01) |
| *G06F 3/0487* | (2013.01) |
| *G06F 3/0488* | (2013.01) |
| *G11B 27/00* | (2006.01) |
| *G11B 27/10* | (2006.01) |
| *G11B 27/34* | (2006.01) |

(52) U.S. Cl.
CPC ........... *G06F 3/0483* (2013.01); *G06F 3/0487* (2013.01); *G06F 3/04855* (2013.01); *G06F 3/04883* (2013.01); *G11B 27/005* (2013.01); *G11B 27/105* (2013.01); *G11B 27/34* (2013.01)

(58) Field of Classification Search
CPC .............. G06F 3/04883; G06F 3/04855; G06F 3/04847; G11B 27/005; G11B 27/105; G11B 27/34
See application file for complete search history.

(56) References Cited

U.S. PATENT DOCUMENTS

| | | | | |
|---|---|---|---|---|
| 6,157,381 A | * | 12/2000 | Bates ................. | G06F 3/04855 345/684 |
| 6,943,811 B2 | | 9/2005 | Matthews | |
| 7,978,177 B2 | | 7/2011 | Nash | |
| 2003/0043174 A1 | * | 3/2003 | Hinckley ............ | G06F 3/03547 345/684 |
| 2009/0063974 A1 | | 3/2009 | Bull | |
| 2010/0156813 A1 | * | 6/2010 | Duarte ................. | G06F 3/0488 345/173 |
| 2010/0231535 A1 | * | 9/2010 | Chaudhri ............. | G06F 3/0481 345/173 |

* cited by examiner

*Primary Examiner* — Aaron Lowenberger
(74) *Attorney, Agent, or Firm* — Great Lakes Intellectual Property, PLLC.

(57) ABSTRACT

Navigation of electronic content using content scrubbing is contemplated. The content scrubbing may include moving from one offset position within the content to another offset position as a function of user interaction with a navigational feature, such as but not necessary limited to scrubbing pages in an e-book or frames in a video according to user interaction with a mouse, touchpad, touchscreen, etc.

20 Claims, 6 Drawing Sheets

CONTENT SCRUBBING

CROSS-REFERENCE TO RELATED APPLICATIONS

This application claims the benefit of U.S. provisional application No. 61/756,496 filed Jan. 25, 2013, the disclosure of which is incorporated in its entirety by reference herein.

TECHNICAL FIELD

The present invention relates to content scrubbing and related actions associated with navigating electronic content, such as but not necessarily limited to scrubbing pages in an e-book or frames in a video.

BACKGROUND

Various types of content are available for electronic navigation using touch-based interfaces available on computers, phones, tablets and other types of devices, such as with a peripheral or integrated navigational feature like a mouse, touchpad, touchscreen, etc. These navigation features may aid a user in flipping pages, forwarding/rewinding frames or otherwise adjusting offset positions associated with definable segments of the underlying content, e.g., each page in a book or each frame in a video may corresponding with a definable offset position. Content scrubbing may be characterized as a process by which the offset positions are adjusted according to user interaction with an associated navigation feature. A content scrubbing ratio of 1:1, for example, may correspond with flipping one page or one frame at a time for a corresponding user interaction with the navigation feature. Such page-by-page or frame-by-frame scrubbing may be relatively slow, particularly if the scrubbed content includes many pages, frames, etc. As such, one non-limiting aspect of the present invention contemplates accelerating scrubbing speed and/or otherwise enabling users greater ease when content scrubbing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
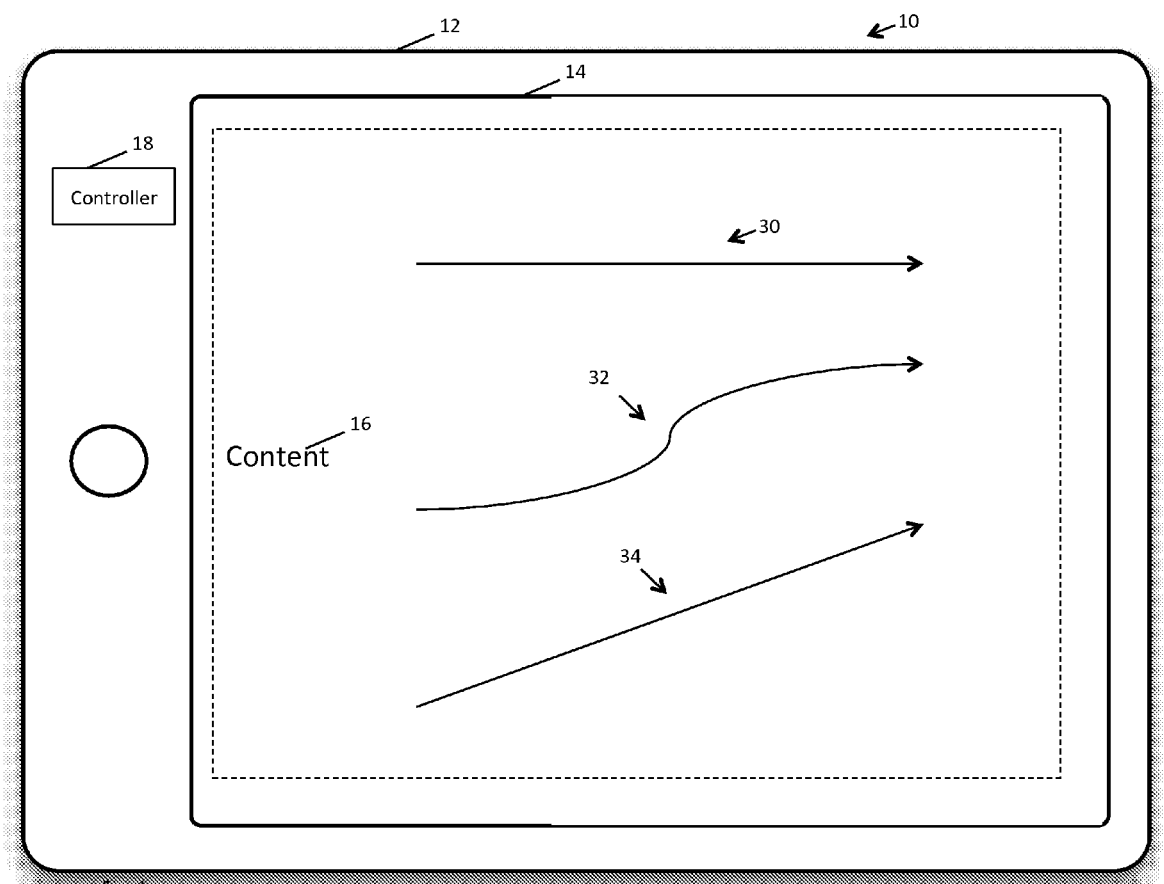
FIG. 1 illustrates a system for scrubbing content in accordance with one non-limiting aspect of the present invention.

FIG. 1 illustrates a system 10 for scrubbing content in accordance with one non-limiting aspect of the present invention. The system illustrates a device 12 with a touchscreen 14 or other touch enabled surface having capabilities sufficient to facilitate interfacing content 16 while simultaneously receiving user inputs and other commands through touches, gestures or other interactions. The device 12 is shown to be in the form of a mobile phone or a tablet computer but may be shaped or otherwise configured as part of other devices or to facilitate the operations contemplated herein. The touchscreen 14 is predominately described to facilitate determining user inputs for exemplary, non-limiting purposes as the contemplated content scrubbing may be facilitated with other types of user interfaces and devices, including devices where the content is available through an interface other the interface detecting the touches or other gestures, such as but not necessarily limited to a mouse or a touchpad operable to remotely control a computer or other device. In particular, the device 12 may be configured to facilitate scrubbing content provided through a television or a settop box (STB), such as when the device acts as a second screen device to augment operations of the television in the manner described in U.S. patent application Ser. Nos. 13/922,386 and 13/755,254, the disclosures of which are hereby incorporated by reference in their entirety.

A controller 18 may be included as part of the device 12 or otherwise in communication therewith to facilitate the contemplated content scrubbing, e.g., the controller 18 could be connected via a wire or a wireless link with the device 12. The controller 18 may include a computer-readable medium having non-transitory instructions operable with a processor and sufficient to facilitate performing and/or commanding performance of the described content scrubbing operations. The controller 18 may be operable with other components of the device 12, such as drivers, players, codecs, tuners, etc., utilized to facilitate interfacing various types of content. The controller 18 may be facilitate content scrubbing by commanding such components to navigate the content from one offset position to another offset position. The change in offset position may be used to facilitate the content scrubbing and is described for example or non-limiting purposes as content scrubbing may be performed in accordance with the present invention without reliance on offset position or other such markers. The offset positions are noted merely to facility communicating how identifiable segments or portions of the content may be scrubbed, i.e., how one portion of the content may be identified and presented to the user is a function of user interactions with the touchscreen.

Figure 2:
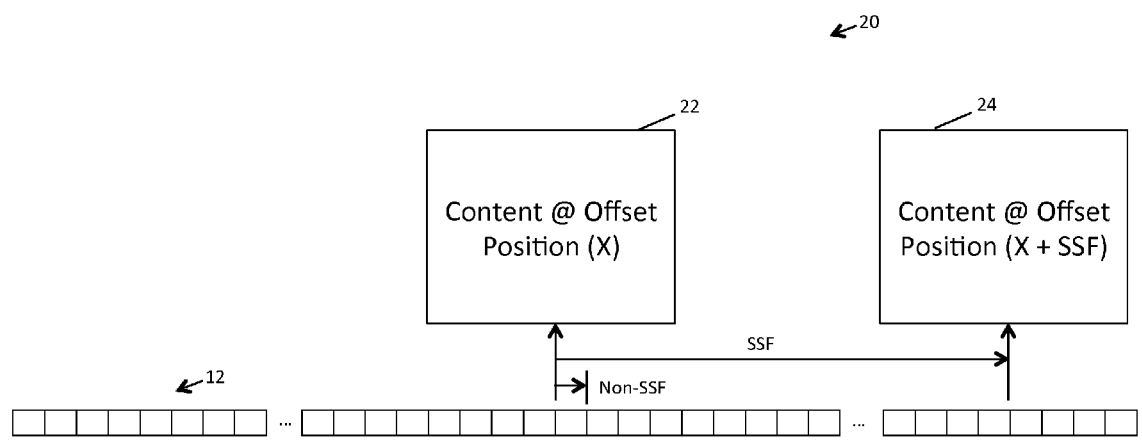
FIG. 2 illustrates a diagram of content scrubbing in accordance with one non-limiting aspect of the present invention.

FIG. 2 illustrates a diagram 20 of content scrubbing in accordance with one non-limiting aspect of the present invention. The diagram 20 illustrates a portion of the content 12 being presented to a user changing from content associated with a first offset position 22 to content associated with a second offset position 24, e.g., by changing the content shown within the touchscreen 14 from that associated with the first offset position 22 to that associated with the second offset position 24. The content 12 is illustrated for exemplary non-limiting purposes to be divided in to a plurality of identifiable segments (each vertical line may correspond with an identifiable segment) where the segments are arranged into a sequential order, left to right from a beginning to and ending, such as in the manner that pages in a book or frames in a video would be arranged. This description of the content 12, however, is not intended to be limiting as the present invention fully contemplates its use and application in facilitating scrubbing of any type of content and not just e-books or videos, including content that may not include such a division of segments or identifiable portions or those that are arranged in a similar sequence. A content source, the controller 18 and/or a user may set the offset positions, such as through bookmarking or other sufficient marking operations, for each of the identifiable segments and/or some lesser number of the identifiable segments, e.g., every fifth segment.

The content 12 is shown to be scrubbed as a function of a scrub speed factor (SSF) determined in accordance with the present invention as a function of user inputs to the touchscreen 14. The SSF may be used to speed, accelerate or otherwise enhance the ability of a user to navigate through the content. The SSF is shown to flip, skip or otherwise navigate to an offset position located farther away from the first position 22 than would otherwise be navigated to using a non-SSF content scrub ratio of 1:1, i.e., a number of pages (scrubbed portion) maybe be skipped when scrubbing according to the SSF whereas no pages are skipped when scrubbing according to the non-SSF. Returning to FIG. 1, a plurality of scrubbing movements 30, 32, 34 are shown to illustrate actions that may result in scrubbing from the first offset position 22 (currently shown content) to the second offset position 24 or some other offset position. The scrubbing movements 30, 32, 34 are described with respect to a user dragging their finger across the surface of the touchscreen 14 for exemplary non-limiting purposes as similar operations may be performed using a stylus and/or with the user otherwise facilitating gestures readable by the device 12, e.g., using hand motions or other non-contacting operations that make use of use capacitive, optical or other capabilities of the device to detect user gestures.

A first scrubbing movement 30 may correspond with a user dragging their finger in a straight, horizontal line from a first position (start) to a second position (end) of the touchscreen 14. A second scrubbing movement 32 may correspond with the user dragging their finger in a curving manner from a third position to a fourth position of the touchscreen. A third scrubbing 34 movement may correspond with the user dragging their finger in a straight little line with an upward slope from a fifth position to a sixth position of the touchscreen. The scrubbing movements 30, 32, 34 are illustrated to occur over top of the displayed content in order to demonstrate one non-limiting aspect of the present invention associated with facilitating integrated scrubbing while accessing content. The controller 18 or other entity tasked with facilitating the contemplated content scrubbing may assess the illustrated scrubbing movements 30, 32, 34 and other, non-illustrated scrubbing movements in order to generate metrics that may be integrated into the various calculations contemplated for the SSF. The controller 18 may calculate distance, speed, travel time, travel path, intensity (e.g., the strength at which a user presses against the touchscreen), etc. The metrics may be calculated relative to a display size of the touchscreen 14 so that the corresponding values may be relatable to a length and width of the touchscreen as measured in pixels (e.g., 1280×800, 3840×2160, etc.) or units of measure (e.g., inches or meters).

The distance may be calculated based on a number of pixels traversed along a path of travel whereby the first scrubbing movement 30 would be the shortest path or based on a width of travel whereby each of the first, second and third scrubbing movements would be the same. The path of travel may be similarly used to facilitate calculating other types of metrics, such as whether the movement is generally upward, downward, leftward or rightward, which may be useful in facilitating correspondingly controlled directional scrubbing (while forward scrubbing is shown in FIG. 2, others scrubbing motions may be similarly performed, including those associated with rewinding or providing other directional movements). The present invention contemplates calculating various metrics for the scrubbing movements and utilizing those metrics differently depending on intended operation, user preferences or other desired modes of operation. As such, the calculations and metrics described herein are provided for exemplary non-limiting purposes as other metrics may be similarly used without deviating from the scope and contemplation of the present invention. The metrics are described as being related to the display size of the touchscreen 14 as such a relation may ease the ability of the user to spatially relate movements within the touchscreen to corresponding scrubbing actions but of course such a relation need not occur.

Figure 3:
FIGS. 3 and 4 illustrate charts associated with a formula for calculating SSF in accordance with one non-limiting aspect of the present invention.
Figure 4:

FIGS. 3 and 4 illustrate charts 38, 40 associated with a formula for calculating SSF in accordance with one non-limiting aspect of the present invention. The charts 38, 40 include an SSF calculated according to SSF=(S/(1/V)/C), wherein S is the display size (shown as pixels but could other unit of measure), V equals D/T where D is the distance associated with the corresponding scrubbing movement (shown as path distance in inches but could be measured in pixels and/or based on horizontal distance as opposed to path length) and T equals time taken to perform the scrubbing movement (shown to be time from the first position to the second position as measured in milliseconds). C is a coefficient selectable to fine tune the SSF as desired, which is shown to be 100 but may be any value and selectable by the user and/or automatically as a function of the content and/or the number of available offset positions, e.g., C may be selected to be greater for a book and than a video due to the video likely having far more available offset positions (lower value C increases SSF), and if desired, set to 1 in order to eliminate its influence. The two charts 38, 40 illustrate SSF differences depending on a width of the monitor 14 in pixels as one non-limiting aspect of the present invention contemplates relating display resolution to content scrubbing, i.e. screens having the same physical dimensions (e.g., a 10.1" tablet) and alternate resolutions perform differently for the same scrubbing movement.

Figure 5:
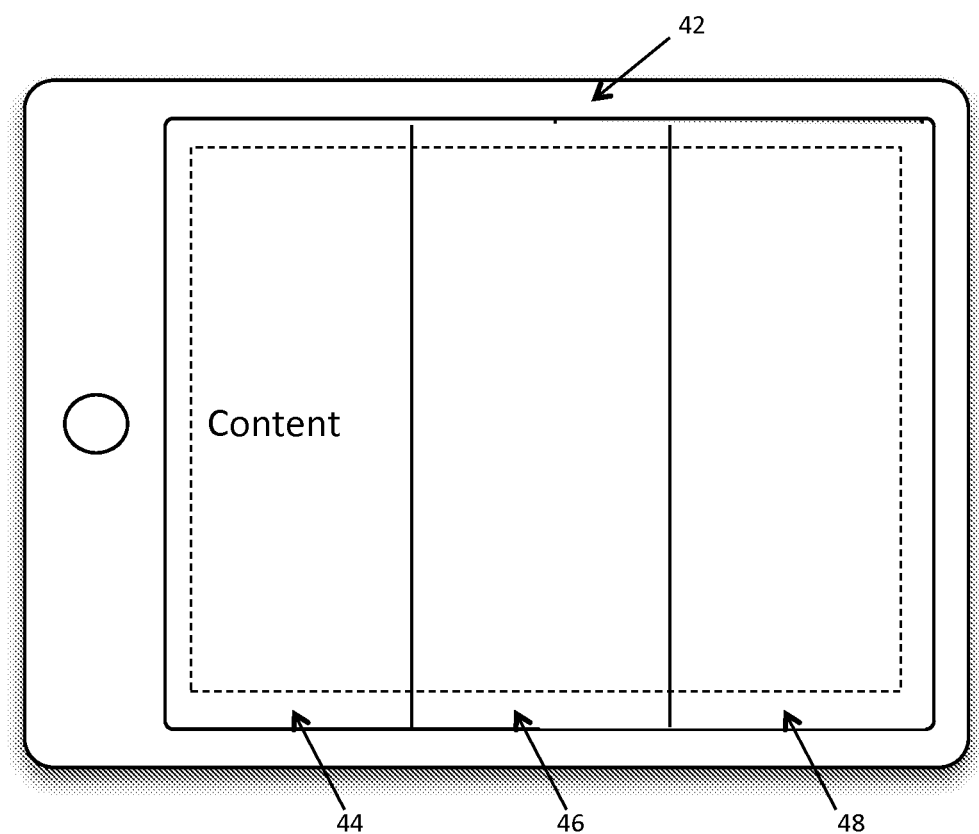
FIG. 5 illustrates a non-linear scrubbing field for calculating SSF in accordance with one non-limiting aspect of the present invention.

FIG. 5 illustrates a non-linear scrubbing field 42 for calculating SSF in accordance with one non-limiting aspect of the present invention. The non-linear scrubbing field 42 may be used to associate each pixel of the touchscreen 14 with a SSF where the SSF assigned to pixels on the left side of the screen are lower than the SSF assigned to pixels at the right side, optionally where the SSF values increase non-linearly the width of the touchscreen. The illustrated scrubbing field 42 is shown for exemplary non-limiting purposes to be vertically spaced according to a left field 44, a middle field 46 and a right field 48. With this differentiation, the SSF may be calculated to correspond with the value associated with a starting point of the corresponding scrubbing movement, e.g., the first, third or fifth positions illustrated in FIG. 1. Based on the SSF of the pixel associated with the starting position, the SSF may be calculated based on distance moved therefrom, such as according to the following: if the starting position is within the left field 44, SSF may equal A*X, wherein A equals a first offset factor and X=S/D where S equals the display size in pixels (could be other measure) and D equals the path distance in pixels for the corresponding scrubbing movement; if the first position is within the middle field 46, SSF may equal B*X wherein B may be a second offset factor greater than A; and if the first position is within the right field 48, SSF may equal C*X wherein C may be a third offset factor greater than B.

Figure 6:
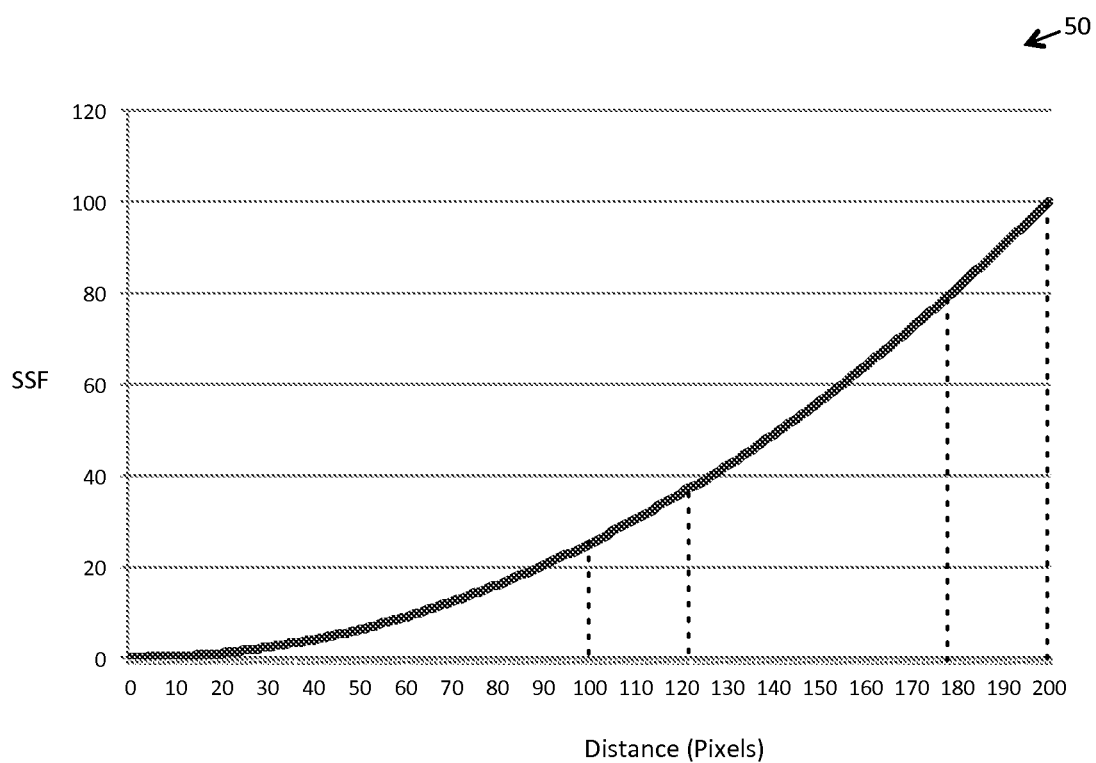
FIG. 6 illustrates a graph such a non-linear SSF progression across the width of the touchscreen in accordance with one non-limiting aspect of the present invention.

Rather than using offset factors (A, B), a lookup-table or logic may be used to calculate the non-linear SSF. As the user drags their finger over some number of pixels close to the center (in the middle field 46) the media offset position may changes by a small amount. As the user drags their finger towards the side (toward the right field 48 and on to the right edge of the display), the media offset position may change more rapidly or exponentially faster. The net result may that the user can exercise very fine grain control over the offset position by dragging their finger in in the middle field 46 and then the user can increase the pace of scrubbing through the media as they move their finger closer to the right field 48. Towards the left side of the navigation control (in the area around the left field 44) the user drags their finger ~20 pixels in order to change the media offset by a mere 2 or 3 positions. In the middle of the navigation control fields 46, when the user drags their finger 20 pixels, the media offset position may change by 10 to 12 positions and around the right field 48, when the user drags their finger over 20 pixels, the media offset may be changed by ~20 positions. FIG. 6 illustrates a graph 50 such a non-linear SSF progression across the width of the touchscreen in accordance with one non-limiting aspect of the present invention (zero corresponds with a left edge of the display and 200 corresponds with a right edge of the display—values are relative it may be adjusted).

Optionally, rather than basing SSF solely on the SSF of the starting position, SSF may be a summation of the SSFs assigned to each pixel traversed with the corresponding scrubbing movement. If scrubbing movement traversed each of the three fields 44, 46, 48, the final SSF value may be based on the SSF value calculated for the portion of the movement taking place within each of the fields 44, 46, 48, i.e., in the manner described above with the distance values for each SSF calculation (number of calculations would equal the number of fields traversed) being set to the distance traveled within each field 44, 46, 48. The non-linear scrubbing may also be achieved using an exponential function, such as SSF equals $C*e^X$, wherein C is a coefficient and X equals S/D where S equals the display size in pixels and D equals the number of pixel traversed for the corresponding scrubbing movement. The exponential-based SSF calculation may provide exponential variability while as being a beneficial alternative to the use of scrubbing-fields 44, 46, 48 as it may eliminate the need for the user to appreciate boundaries or other demarcations of the scrubbing field variations and instead simply rely upon pixels traversed or one the other noted distance calculations.

Figure 7:
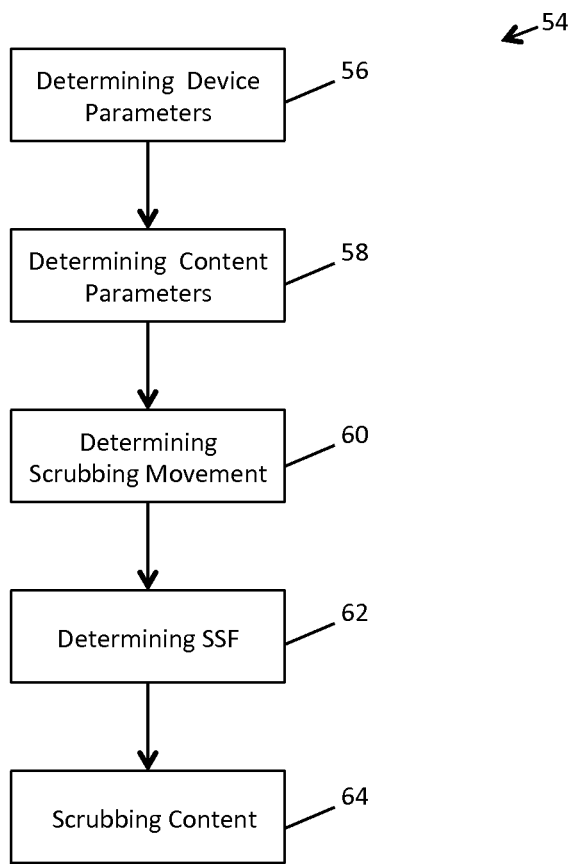
FIG. 7 illustrates a flowchart for content scrubbing in accordance with one non-limiting aspect of the present invention.

FIG. 7 illustrates a flowchart 54 for content scrubbing in accordance with one non-limiting aspect of the present invention. Block 56 relates to determining a display size or other parameters of the device to be used and facilitating the content scrubbing. Block 58 relates to determining content parameters, such as a plurality of offset positions identified within the content and/or other information that may be useful facilitating to facilitate displaying different portions of the content. Block 60 relates to determining a touch or other scrubbing type of movement, such as a user moving a finger or a device against a surface of the device from a first position to a second position. Block 62 relates to determining and SSF for the scrubbing movement, such as using one of the above-described SSF calculations and/or based on the display size and the distance of travel associated with the scrubbing movement. Block 64 relates to scrubbing the content from a first offset position to a second offset position where a first scrubbed portion of the plurality of offset positions separating the first offset position from the second offset position is skipped or rapidly displayed. The first scrubbed portion or number of skipped offset positions may be proportional to the SSF such that more of the plurality of the offset positions fall within the first scrubbed portion when the SSF is higher and less of the plurality of offset positions are included within the first scrubbed portion when the SSF is lower.

As supported above, one non-limiting aspect of the present invention relates to recognizing the speed of a touch in relation to the display width, and based thereon enabling, the system to interpret or translate the speed of touch into an acceleration factor (SSF) that can be applied to very large collections of media or content, such as digital image collections, videos or even digitally portrayed virtual reality environments. The speed of the accelerated touch may enable the user to indicate that s/he wishes to increase improve that ratio of speed through the content in relation to finger movement, which may be provided a experience similar to the tactile task of thumbing through the pages of a large book. Various user behaviors and algorithms may be utilized to facilitate the content scrubbing, including starting a scrub action when the user places their finger in the center of the targeted content and holds for two seconds such that a prolonged, steady hold, as opposed to a tap or a double tap, will indicate the user's intent to start the scrubbing action of the target content or content collection, and use of a relative expression based on the size of the touch interface to facilitate speed of a finger slide drive scrubbing speed on any type of device (all-in-one touch screen, tablet, phone, large-scale touch walls, etc.) If the user starts at an edge position (next to the bezel location) of the device, and holds down for two seconds, the scrubbing action may be assumed and the maximum velocity for the particular device may be instigated (scrubbing may stop when the finger is lifted from the touch surface).

One non-limiting aspect of the present invention relates to changing the current offset position in digital media such that a user can drag a finger across a touch pad (or a touch screen) device. The position in the digital media offset position may change non-linearly (exponentially) with respect to how far the user drags their finger across the touch pad and may be used to navigate, including forward and backwards, through digital media, for example, an e-book or a video. (This type of navigation is also referred to as "scrubbing"). On a device with a touch-interface (like a touch-pad or a touch-screen), the user drags their finger in different directions to navigate forwards or backwards through the media. As the user drags their finger, the media offset position is changed. For e-books, the offset is a page number or a "book position". For a video, the offset may be the time (hours, minutes and seconds) from the start or the end of the video. Non-linear scrubbing may allow the user to exercise fine-grained control over the navigation and make small and precise changes in the media offset position, while also allowing the user to quickly make large navigational jumps through the media. This method of navigation may provide a very elegant navigational style through a wide range of digital media and/or so that the navigation style through digital media is more closely simulate with how a person typically flips through a physical book. (You can easily flip through 1 or 2 pages at a time, then make larger jumps, then immediately go back to flipping to a page at a time). Though linear movement is contemplated, the non-linear scrubbing may be beneficial in allowing movement without requiring the user to enter the desired offset position that they wish to jump to. Non-linear scrubbing may include 1x, 2x, 4x, etc., positioning on touch devices. The user must move their finger vertically to change the rate of scrubbing, which may be less accurate and more cumbersome to the point of frustration. The non-linear scrubbing may allow the user to move their finger in a single direction and continue in that direction to increase the rate of scrubbing. A radial knob may be used for non-linear positioning where the more knob turns (rotation multi-touch gesture), the faster the content is scrubbed. This methodology can be extended to view 3d objects, such as browsing a car engine by just using an inch or two of track pad or touch screen surface and/or replacing pinch-to-zoom with protractor style navigation, and/or large scale data sets (high volumes of data will be collected when devices collect sensor data down to the millisecond).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for content scrubbing using a touchscreen comprising:
    determining a display size of the touchscreen in inches or meters;
    determining a resolution of the touchscreen in pixels;
    determining content being displayed within the touchscreen;
    determining a plurality of offset positions for the content, each offset position being navigable to facilitate displaying a different portion of the content within the touchscreen and arranged in an order such that each offset position is spatially separated from each of the other offset positions;
    determining a first touch associated with a user continuously moving a finger or a device against a surface of the touchscreen from a first position to a second position, including determining a first distance between the first position and the second position;
    determining a scrubbing speed factor (SSF) based on the display size, the resolution and the first distance such that when the display size equals a first value the SSF is greater when the resolution is greater and less when the resolution is less;
    scrubbing the content from a first offset position to a second offset position of the plurality of offset positions, a first scrubbed portion of the plurality of offset positions separating the first offset position from the second offset position, the first scrubbed portion being proportional to the SSF such that more of the plurality of the offset positions fall within the first scrubbed portion when the SSF is higher and less of the plurality of offset positions are included within the first scrubbed portion when the SSF is lower.

2. The method of claim 1 further comprising determining the SSF according to:
    $SSF=S/((1/V)*C)$, wherein
    S=the first value;
    V=D/T, D=the first distance and T=a first time, the first time representing time taken for the finger or the device to move the first distance; and
    C=a coefficient.

3. The method of claim 2 further comprising determining the first value to equal a width of the touchscreen.

4. The method of claim 2 further comprising determining the coefficient (C) accordinq to a quantity of the plurality of offset positions such that the coefficient is lower when the quantity is greater and greater when the quantity is lower.

5. The method of claim 1 further comprising determining the first distance to equal a number of pixels of the touchscreen traversed when the finger or the device moves from the first position to the second position.

6. The method of claim 1 further comprising determining the first distance to equal a linear distance in inches or meters traversed when the finger or the device moves from the first position to the second position.

7. The method of claim 1 further comprising:
    determining a second touch associated with the user moving the finger or the device against a surface of the touchscreen from a third position to a fourth position, including determining a second distance between the first position and the second position;
    determining a non-SSF based on the second distance; and
    scrubbing the content from the second offset position to a third offset position of the plurality of offset positions, a second scrubbed portion of the plurality of offset positions separating the second offset position from the third offset position, the second scrubbed portion being proportional to the non-SSF.

8. The method of claim 7 further comprising determining the second scrubbed portion to be less than the first scrub portion when the second distance equals the first distance.

9. The method of claim 1 further comprising:
    separating the touchscreen vertically into a left side, a middle and a right side;
    determining the SSF according to:
    i) if the first position is within the left side, $SSF=A*X$, wherein A=a first offset factor and X=S/D where S=the first value and D=the first distance in pixels;
    ii) if the first position is within the middle, $SSF=B*X$, wherein B=a second offset factor, B being greater than A; and
    iii) if the first position is within the right side, $SSF=C*X$, wherein C=a third offset factor, C being greater than B.

10. The method of claim 1 further comprising determining SSF according to:
    $SSF=C*e^{X}$, wherein C=a coefficient and X=S/D where S=the first value and D=the first distance in pixels.

11. The method of claim 1 further comprising:
    determining the plurality of offset positions to be arranged sequentially from a beginning to an ending of the content;
    determining a direction of travel from the first position to the second position as corresponding with one of a forward motion and a rearward motion; and
    scrubbing the content such that the second offset position occurs after the first offset position if the direction of travel corresponds with the forward motion and scrubbing the content such that the second offset position occurs before the first offset position if the direction of travel corresponds with the rearward motion.

12. A non-transitory computer-readable medium having a plurality of instructions, operable with a processor, to facilitate content scrubbing using a touchscreen, the non-transitory computer-readable medium comprising instructions sufficient for:
  determining a plurality of offset positions for content displayed within the touchscreen, each offset position being navigable to facilitate displaying a different portion of the content;
  determining a scrubbing movement being performed on the touchscreen, the scrubbing movement traversing a distance on the touchscreen from a first position to a second position;
  determining a scrubbing speed factor (SSF) as a function of a speed associated with the scrubbing movement and a display size of the touchscreen;
  scrubbing the content from a first one to a second one of the plurality of offset positions in proportion to the SSF; and
  determining the SSF according to the SSF=S/((1/V)*C), wherein
    i) S=the display size in inches or meters;
    ii) V=the speed as D/T, D=the distance in pixels traversed and T=time taken for the scrubbing movement; and
    iii) C=a coefficient.

13. The computer-readable medium of claim 12 further comprising instructions sufficient for determining the display size (S) to equal a width of the touchscreen in inches or meters.

14. The computer-readable medium of claim 13 further comprising instructions sufficient for determining the coefficient (C) according to a quantity of the plurality of offset positions such that the coefficient is lower when the quantity is greater and greater when the quantity is lower.

15. A non-transitory computer-readable medium having a plurality of instructions, operable with a processor, to facilitate content scrubbing using a touchscreen, the non-transitory computer-readable medium comprising instructions sufficient for:
  determining a display size of the touchscreen in inches or meter;
  determining a resolution of the touchscreen in pixels;
  determining a plurality of offset positions for content displayed within the touchscreen, each offset position being navigable to facilitate displaying a different portion of the content;
  separating the touchscreen into a first portion, a second portion and a third portion;
  determining a scrubbing movement being performed on the touchscreen whereby a finger or a device continuously touches the touchscreen while traversing within at least two of the first, second and third portions, the scrubbing movement including the finger or the device traversing the touchscreen from a first position associated with a beginning of the scrubbing movement to a second position associated with an ending of the scrubbing movement;
  determining a non-linear scrubbing field for the touchscreen, the non-linear scrubbing field associating each of the first, second and third portions of the touchscreen with a scrubbing speed factor (SSF) such that the first portion is associated with a first SSF, the second portion is associated with a second SSF and the third portion is associated with a third SSF, the first SSF being less than the second SSF and the second SSF being less than the third SSF;
  determining the SSF based on the display size, the resolution and the scrubbing movement such that such that when the display size equals a first value the SSF is greater when the resolution is greater and less when the resolution is less; and
  scrubbing the content from a first one to a second one of the plurality of offset positions such that a first scrubbing portion of the plurality of offset positions separating the first offset position from the second offset position is proportional to two or more SSFs associated with the scrubbing movement, the two or more SSFs corresponding with each of the first, second, and third SSFs respectively associated with the at least two of the first, second and third portions traversed with the scrubbing movement.

16. The non-transitory computer-readable medium of claim 15 further comprising instructions sufficient for:
  separating the touchscreen vertically such that the first portion corresponds with a left side, the second portion corresponds with a middle and the third portion corresponds with a right side.

17. The non-transitory computer-readable medium of claim 15 further comprising instructions sufficient for determining the first scrubbed portion as being proportional to a summation of the two or more SSFs.

18. The non-transitory computer-readable medium of claim 17 further comprising instructions sufficient for:
  determining the scrubbing movement to traverse each of the first, second and third portions;
  determining the SSF =a second value;
  determining the first SSF=Y*A*X1 wherein:
    i) Y=the second value;
    ii) A=a first offset factor; and
    iii) X1 =S/D1 wherein
      (1) S=a size of the touchscreen in inches or meters; and
      (2) D1=a quantity of pixels of the touchscreen traversed within the first portion for the scrubbing movement;
  determining the second SSF=Y*B*X2 wherein:
    i) Y=the second value;
    ii) B=a second offset factor greater than A; and
    iii) X2=S/D2 wherein
      (1) S=the size of the touchscreen in inches or meters; and
      (2) D2=a quantity of pixels of the touchscreen traversed within the second portion for the scrubbing movement; and
  determining the third SSF=Y*C*X3 wherein:
    i) Y=the second value;
    ii) C=a third offset factor greater than B; and
    iii) X3=S/D3 wherein:
      (1) S=the size of the touchscreen in inches or meters; and
      (2) D3=a quantity of pixels of the touchscreen traversed within the third portion for the scrubbing movement.

19. The non-transitory computer-readable medium of claim 17 further comprising instructions sufficient for:
  determining the scrubbing movement to traverse each of the first, second and third portions;
  determining the first SSF=S/((1/V)*C)wherein:
    iv) S=a size of the touchscreen in inches or meters;
    v) C=a coefficient; and
    vi) V1=D1/T1, D1=a quantity of pixels of the touchscreen traversed within the first portion for the scrubbing movement and T1=a first time taken for the finger or device to traverse the first portion; and
  determining the second SSF=S/((1/V2)*C), wherein:

i) S=the size of the touchscreen in inches or meters;
ii) C=the coefficient; and
iii) V2=D2/T2, D2=a quantity of pixels of the touchscreen traversed within the second portion for the scrubbing movement and T2=a second time taken for the finger or device to traverse the second portion;

determining the third SSF=S/((1/V3)*C), wherein:
i) S=the size of the touchscreen in inches or meters;
ii) C=the coefficient; and
iii) V3=D3/T3, D3=a quantity of pixels of the touchscreen traversed within the third portion for the scrubbing movement and T3=a second time taken for the finger or device to traverse the second portion.

20. The non-transitory computer-readable medium of claim 17 further comprising instructions sufficient for:
determining the scrubbing movement to traverse each of the first, second and third portions;
determining the first SSF=$A*C*e^{X1}$ wherein:
i) C=a coefficient;
ii) A=a first offset factor; and
iii) X1=S/D1 wherein:
(1) S=a size of the touchscreen in inches or meters; and
(2) D1=a quantity of pixels of the touchscreen traversed within the first portion for the scrubbing movement;

determining the second SSF=$B*C*e^{X2}$ wherein:
i) C=the coefficient;
ii) B=a second offset factor greater than A; and
iii) X2=S/D2 wherein
(1) S=the size of the touchscreen in inches or meters; and
(2) D2=a quantity of pixels of the touchscreen traversed within the second portion for the scrubbing movement; and determining the third SSF=$D*C*e^{X3}$ wherein:
i) C=the coefficient;
ii) D=a third offset factor greater than B; and
iii) X3=S/D3 wherein
(1) S=the size of the touchscreen in inches or meters; and
(2) D3 =a quantity of pixels of the touchscreen traversed within the third portion for the scrubbing movement.

* * * * *